(12) United States Patent  
Liu

(10) Patent No.: US 12,546,136 B2
(45) Date of Patent: Feb. 10, 2026

(54) CANOPY ENGAGEMENT DEVICE AND CANOPY WITH THE CANOPY ENGAGEMENT DEVICE

(71) Applicant: WONDERLAND SWITZERLAND AG, Steinhausen (CH)

(72) Inventor: Kaiqin Liu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 479 days.

(21) Appl. No.: 18/073,674

(22) Filed: Dec. 2, 2022

(65) Prior Publication Data
US 2023/0175283 A1 Jun. 8, 2023

(30) Foreign Application Priority Data

Dec. 2, 2021 (CN) .......................... 202111457959.4

(51) Int. Cl.
| | | |
|---|---|---|
| *E04H 15/38* | (2006.01) | |
| *A47D 15/00* | (2006.01) | |
| *B62B 9/14* | (2006.01) | |
| *E04H 15/48* | (2006.01) | |
| *F16C 11/10* | (2006.01) | |

(Continued)

(52) U.S. Cl.
CPC ............. *E04H 15/38* (2013.01); *A47D 15/00* (2013.01); *B62B 9/142* (2013.01); *B62B 9/147* (2013.01); *E04H 15/48* (2013.01); *F16C 11/10* (2013.01); *A47D 9/00* (2013.01); *A47D 9/005* (2013.01); *A47D 13/063* (2013.01); *F16C 11/103* (2013.01)

(58) Field of Classification Search
CPC ............ B62B 9/14; B62B 9/142; B62B 9/147
See application file for complete search history.

(56) References Cited

U.S. PATENT DOCUMENTS 5,062,179 A * 11/1991 Huang ..................... B62B 9/20
403/93
5,551,745 A * 9/1996 Huang .................. B60J 7/1282
135/133

(Continued)

FOREIGN PATENT DOCUMENTS

| CN | 1347677 A | 5/2002 |
|---|---|---|
| CN | 1572185 A | 2/2005 |

(Continued)

OTHER PUBLICATIONS

Taiwan 1st Office Action issued in corresponding Taiwan Application No. 111146401, dated Jun. 7, 2023, pp. 1-8.

(Continued)

*Primary Examiner* — David R Dunn
*Assistant Examiner* — Danielle Jackson
(74) *Attorney, Agent, or Firm* — HAUPTMAN HAM, LLP

(57) ABSTRACT

A canopy engagement device including a socket, provided with a base end and an engagement end, the engagement end being engaged with the carrier, a first rotation base provided between the base end of the socket and the second rotation base, a second rotation base, the first and second rotation bases being rotatable relative to the socket, and a locking member, disposed between the first rotation base and the second rotation base, rotatable along with the first rotation base to limit an angle between the first rotation base and the second rotation base in a range.

20 Claims, 16 Drawing Sheets

(51) Int. Cl.
　　　*A47D 9/00*　　　　(2006.01)
　　　*A47D 13/06*　　　(2006.01)

(56) References Cited

U.S. PATENT DOCUMENTS

| | | | | |
|---|---|---|---|---|
| 5,845,666 | A | * 12/1998 | Messner | E04H 15/44 |
| | | | | 16/334 |
| 6,139,046 | A | * 10/2000 | Aalund | B62B 9/20 |
| | | | | 280/47.38 |
| 6,877,761 | B2 | * 4/2005 | Hsia | B62B 7/123 |
| | | | | 280/658 |
| 6,948,197 | B1 | 9/2005 | Chen | |
| 7,753,397 | B2 | * 7/2010 | Yang | B62B 9/14 |
| | | | | 280/47.38 |
| D646,208 | S | * 10/2011 | Ohnishi | D12/133 |
| 8,186,368 | B2 | * 5/2012 | Troutman | B62B 9/14 |
| | | | | 135/88.02 |
| 11,472,318 | B2 | * 10/2022 | Cui | B60N 2/2872 |
| 12,233,932 | B2 | * 2/2025 | Sun | B62B 5/0013 |
| 2004/0179891 | A1 | * 9/2004 | Watkins | F16C 11/10 |
| | | | | 403/96 |
| 2008/0088116 | A1 | * 4/2008 | Den Boer | B62B 7/142 |
| | | | | 280/650 |
| 2009/0194973 | A1 | * 8/2009 | Wang | B62B 7/147 |
| | | | | 280/642 |

FOREIGN PATENT DOCUMENTS

| | | | | |
|---|---|---|---|---|
| CN | 2722750 | | 9/2005 | |
| CN | 101454528 | | 6/2009 | |
| CN | 201312666 | Y | 9/2009 | |
| CN | 201480760 | | 5/2010 | |
| CN | 202751093 | U | 2/2013 | |
| CN | 203106447 | | 8/2013 | |
| CN | 203341382 | | 12/2013 | |
| CN | 203619163 | | 6/2014 | |
| CN | 104097545 | A * | 10/2014 | B60N 2/28 |
| CN | 204292702 | | 4/2015 | |
| CN | 104706090 | | 6/2015 | |
| CN | 204393949 | | 6/2015 | |
| CN | 204708435 | | 10/2015 | |
| CN | 105029960 | | 11/2015 | |
| CN | 204797318 | | 11/2015 | |
| CN | 105882721 | | 8/2016 | |
| CN | 207049181 | | 2/2018 | |
| CN | 208447059 | | 2/2019 | |
| CN | 109625072 | A * | 4/2019 | B62B 9/14 |
| CN | 109875316 | | 6/2019 | |
| CN | 209535315 | | 10/2019 | |
| CN | 110448101 | | 11/2019 | |
| CN | 211568069 | | 9/2020 | |
| CN | 217161519 | | 8/2022 | |
| CN | 117657277 | A * | 3/2024 | |
| CN | 118844774 | A * | 10/2024 | |
| DE | 20102564 | U1 | 4/2001 | |
| DE | 102021000001 | A1 | 7/2021 | |
| FR | 2834626 | | 7/2003 | |
| GB | 2518809 | A * | 4/2015 | B62B 9/12 |
| JP | 2016150654 | A * | 8/2016 | B60J 3/002 |
| TW | 453283 | U | 9/2001 | |
| TW | M339980 | U | 9/2008 | |
| WO | 2006067509 | A1 | 6/2006 | |
| WO | WO-2022010002 | A1 * | 1/2022 | A61G 5/10 |

OTHER PUBLICATIONS

First Office Action issued in Taiwan Patent Application No. 113110170, mailed Jul. 15, 2024, 7 pgs.
First Office Action in Corresponding Chinese Application No. 202110709966.2, dated Apr. 22, 2025; 21 pgs.
First Office Action in Corresponding Chinese Application No. 202111457959.4, dated Jul. 1, 2025; 16 pgs.

* cited by examiner

CANOPY ENGAGEMENT DEVICE AND CANOPY WITH THE CANOPY ENGAGEMENT DEVICE

CROSS REFERENCE TO RELATED APPLICATION

This application claims priority of Chinese Patent Application No. 202111457959.4, entitled "CANOPY ENGAGEMENT DEVICE AND CANOPY WITH THE CANOPY ENGAGEMENT DEVICE", filed on Dec. 2, 2021, the entire content of which is incorporated herein by reference.

TECHNICAL FIELD

The present application relates to a canopy engagement device and a canopy with the canopy engagement device.

BACKGROUND

Baby bed is a common and widely used household product. In the use environment such as beach leisure travel, it is required to provide a portable and foldable baby bed. Such a baby bed includes a bed body, a fence, and a sunscreen canopy structure.

Most of the existing canopy structures are fixed or non-adjustable integral type. In order to satisfy the requirement of flexible using, it is required to provide a new canopy structure, which has the advantage of convenient disassembly, and the shape of the canopy structure can be flexibly adjusted, which can be freely converted between half cover mode and fully cover mode to satisfy different use requirements.

SUMMARY

A canopy engagement device according to the present application for installing a first canopy rod and a second canopy rod to a carrier is disclosed. The canopy engagement device comprises: a socket, provided with a base end and an engagement end, the engagement end being engaged with the carrier; a first rotation base and a second rotation base, the first rotation base provided between the base end of the socket and the second rotation base, the first rotation base and the second rotation base being rotatable relative to the socket, and the first canopy rod and the second canopy rod respectively inserted into the first rotation base and the second rotation base; and a locking member, disposed between the first rotation base and the second rotation base, rotatable along with the first rotation base to limit an angle between the first rotation base and the second rotation base in a range.

In an embodiment, the base end of the socket has a disc shape, the first rotation base and the second rotation base are respectively provided with a first disc-shaped part and a second disc-shaped part, the first disc-shaped part and the second disc-shaped part are sequentially overlapped on the base end along a rotation axis.

In an embodiment, one of the first rotation base and the base end has a first positioning protrusion rising toward the other, wherein the other has at least one first positioning depression accommodating the first positioning protrusion so as to limit an angle between the first rotation base and the base end; and a plurality of said first positioning depressions are distributed along a circumference around the rotation axis.

In an embodiment, the locking member is fixed to the first rotation base, one of the second rotation base and the locking member has a second positioning protrusion rising toward the other, the other has at least one second positioning depression accommodating the second positioning protrusion so as to limit an angle between the second rotation base and the first rotation base; and a plurality of said second positioning depression are distributed along a circumference around the rotation axis.

In an embodiment, the engagement end and the base end of the socket are oppositely provided along a vertical direction perpendicular to the rotation axis.

In an embodiment, a first rotation limiting part is arranged at circumferential position of the socket, a first dipping part is arranged at corresponding circumferential position of the first rotation base, the first rotation limiting part interacts with the first clipping part, such that the first rotation base is limited to rotate between a first angle position and a second angle position relative to the socket; when viewed from the socket, if the engagement end of the socket is located at six o'clock on a clock plane, the first angle position is located at approximately three o'clock, the second angle position is located at approximately eleven o'clock.

In an embodiment, a second clipping part is arranged at circumferential position of the second rotation base, and the second clipping part interacts with the first clipping part, such that the second rotation base is limited to rotate relative to the first rotation base in a range of 0-180°.

In an embodiment, the first rotation base has a hollow cylindrical shape, the locking member has a disc shape, the locking member is provided in a hollow cylindrical space of the first rotation base; one of an inner wall of the first rotation base and an outer wall of the locking member is provided with an externally convex insert block, and the other is provided with an internally concave slot; through the connection between the slot and the insert block, the locking member is disposed in the first rotation base in a non-rotatable manner with respect to the first rotation base.

In an embodiment, an elastic member is disposed between the first rotation base and the locking member, the elastic member biases the first rotation base and the locking member apart from each other, such that the first rotation base is pressed against the engagement end of the socket, and the locking member is pressed against the second rotation base.

A carrier with a sunshade according to the present application is disclosed. The carrier comprises: a frame, upper part of which is provided with a installing part; the canopy engagement device according to the present application, wherein an engagement end of the socket is engaged on the installing part of the frame a cover cloth is connected between the first canopy rod and the second canopy rod, and deploys or collapses along with the relative rotation between the first canopy rod and the second canopy rod.

In an embodiment, at least one additional intermediate support rod is arranged between the first canopy rod and the second canopy rod.

In an embodiment, the canopy is provided with at least one collapsible fixing device along a deployment direction, when the canopy is collapsed or partially collapsed, adjacent said intermediate support rods in a collapsed state lock with each other through the collapsible fixing device to prevent deployment of both.

In an embodiment, the frame is provided with a plurality of installing parts along circumference, the canopy engagement device is engaged on any one of the installing parts, and the socket of the canopy engagement device is provided with a plurality of clamping part for clamping connection with a joint part on the installing part.

BRIEF DESCRIPTION OF THE DRAWINGS

The embodiments of the present application will be described in detail below in combination with the accompanying drawings, in which.

DETAILED DESCRIPTION

Figure 1:
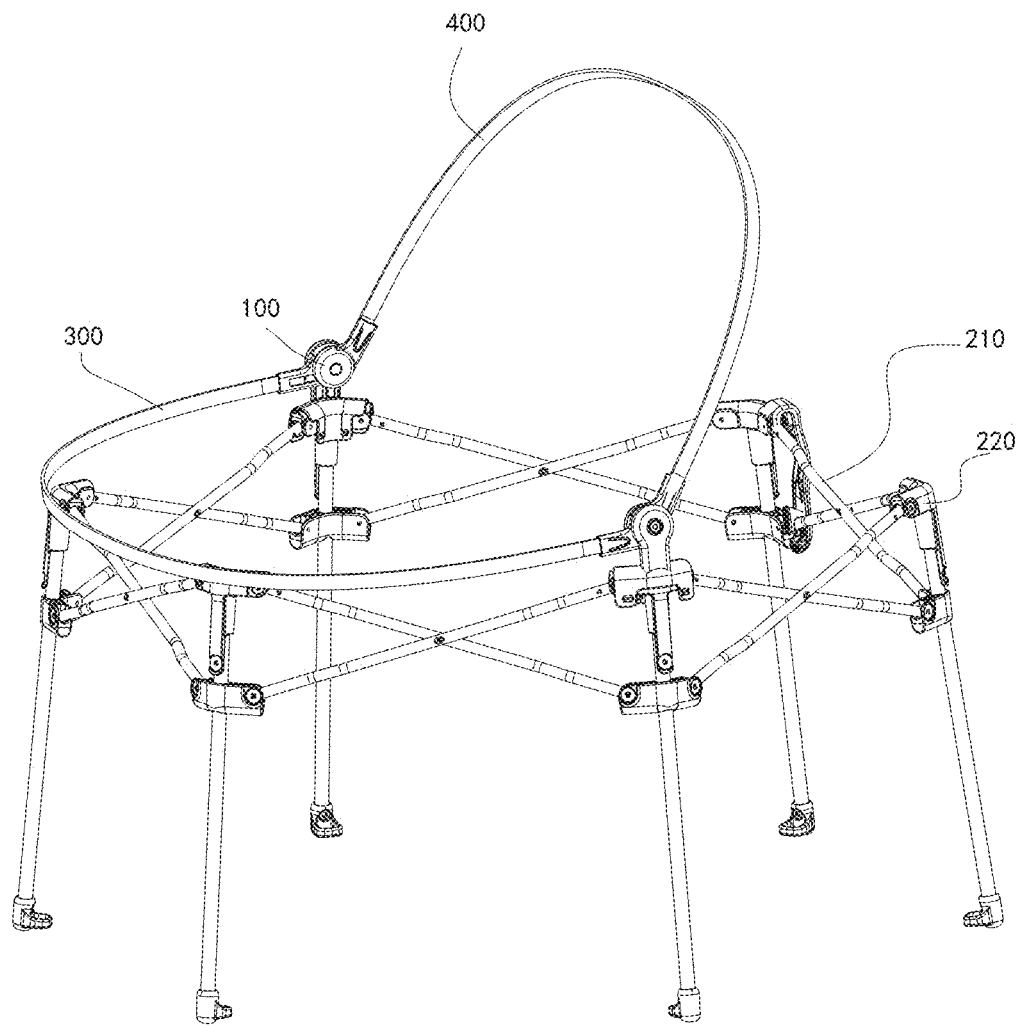
FIG. 1 to 4 respectively illustrate perspective views of different angles of the baby bed according to the present application, wherein the first canopy rod is in the deployed position, the second canopy rod is in the collapsed position, and the cover cloth and surround cloth are not illustrated.
Figure 2:
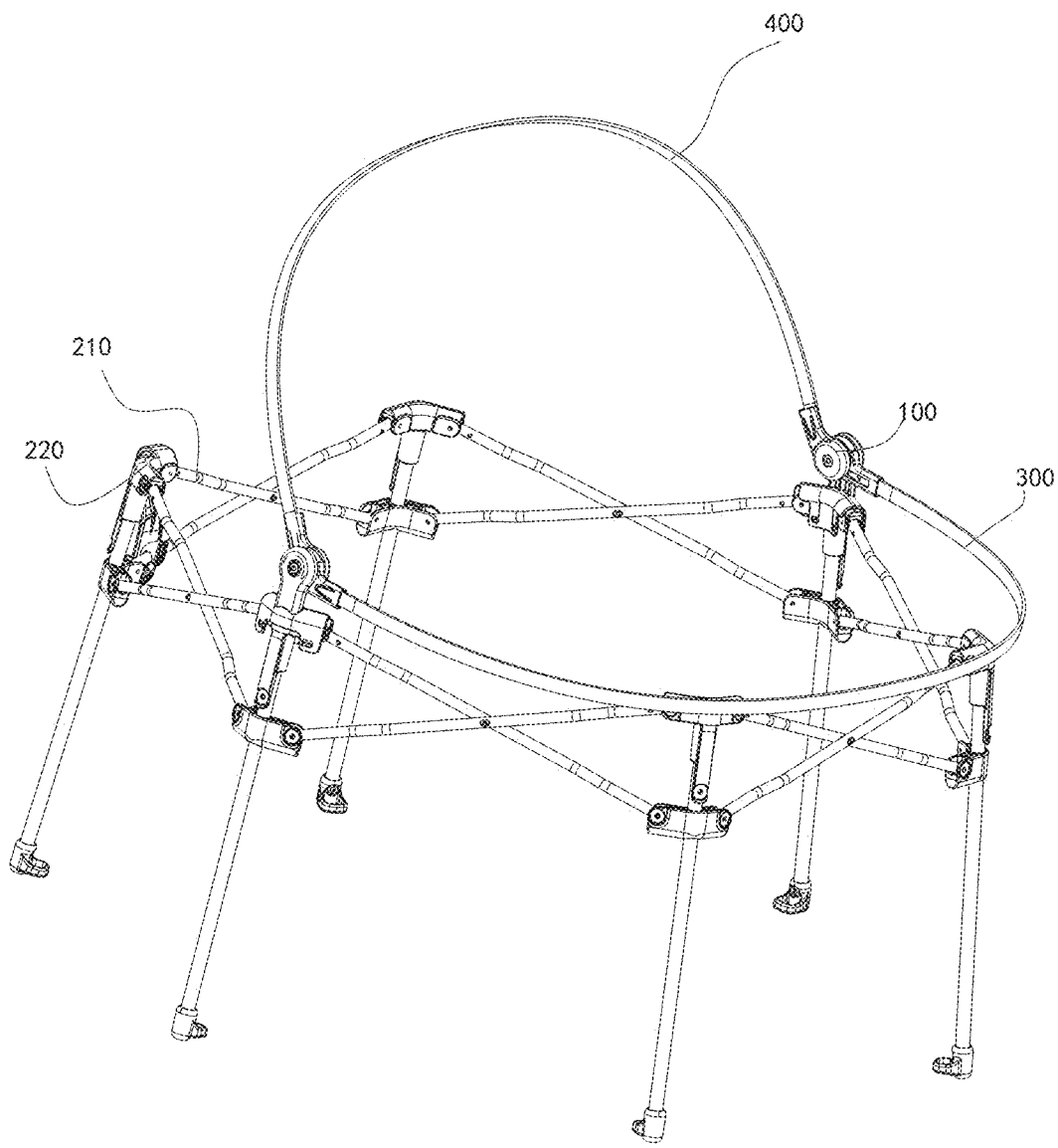
Figure 3:
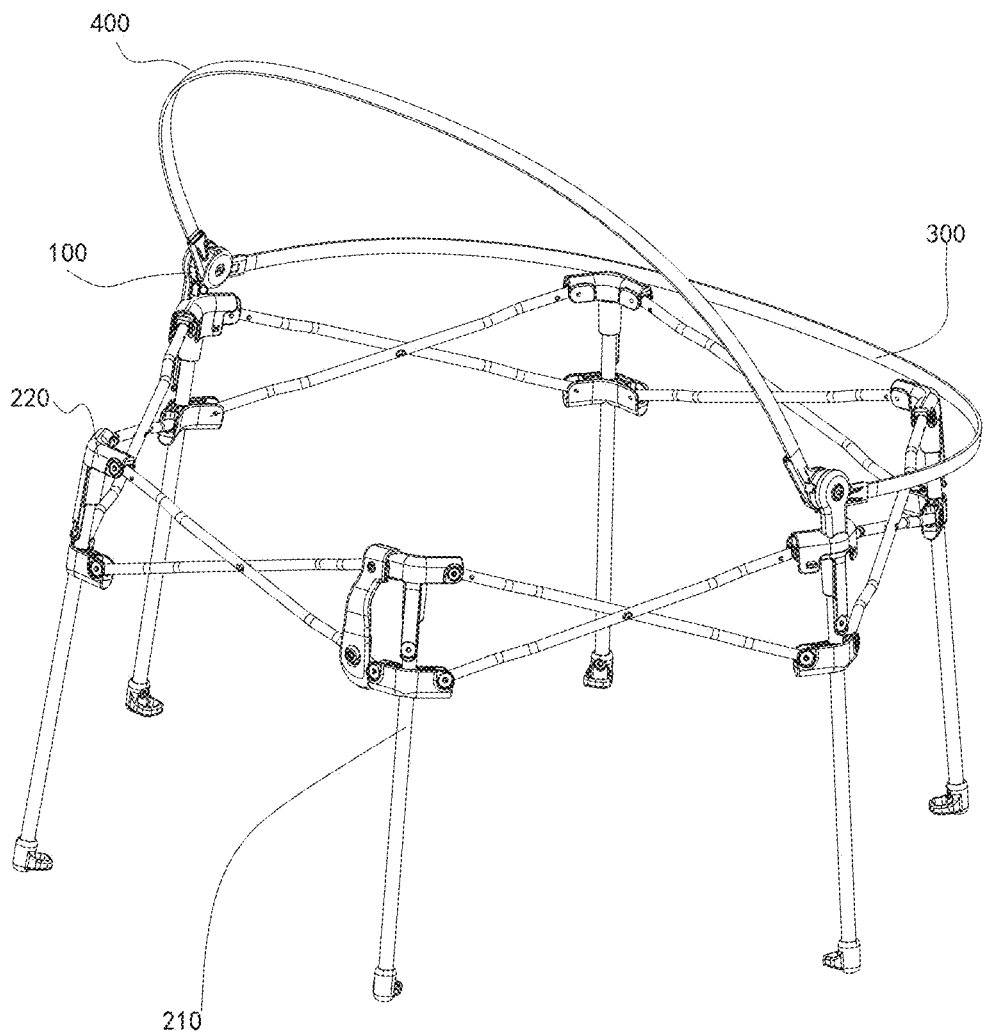
Figure 4:
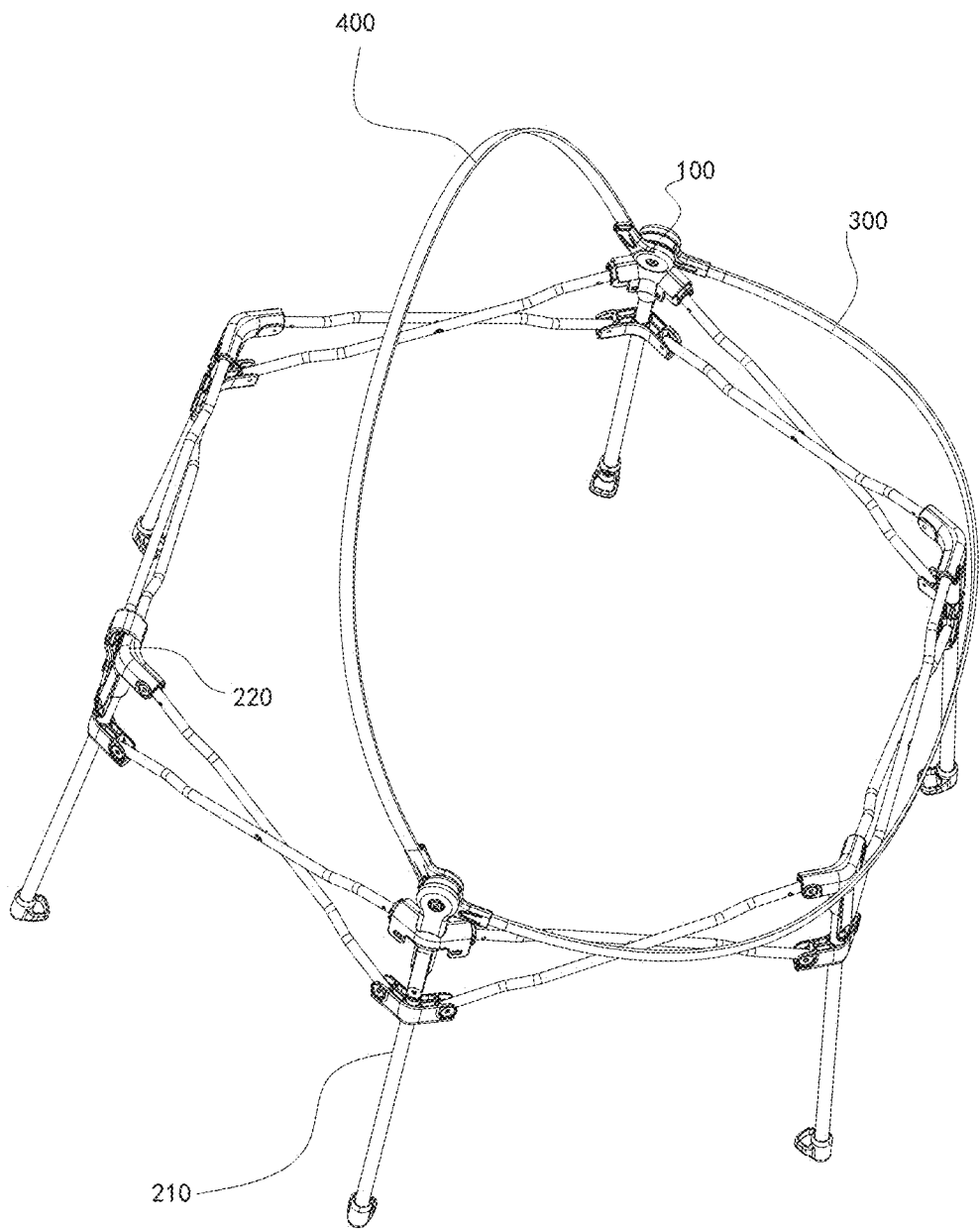
Figure 5:
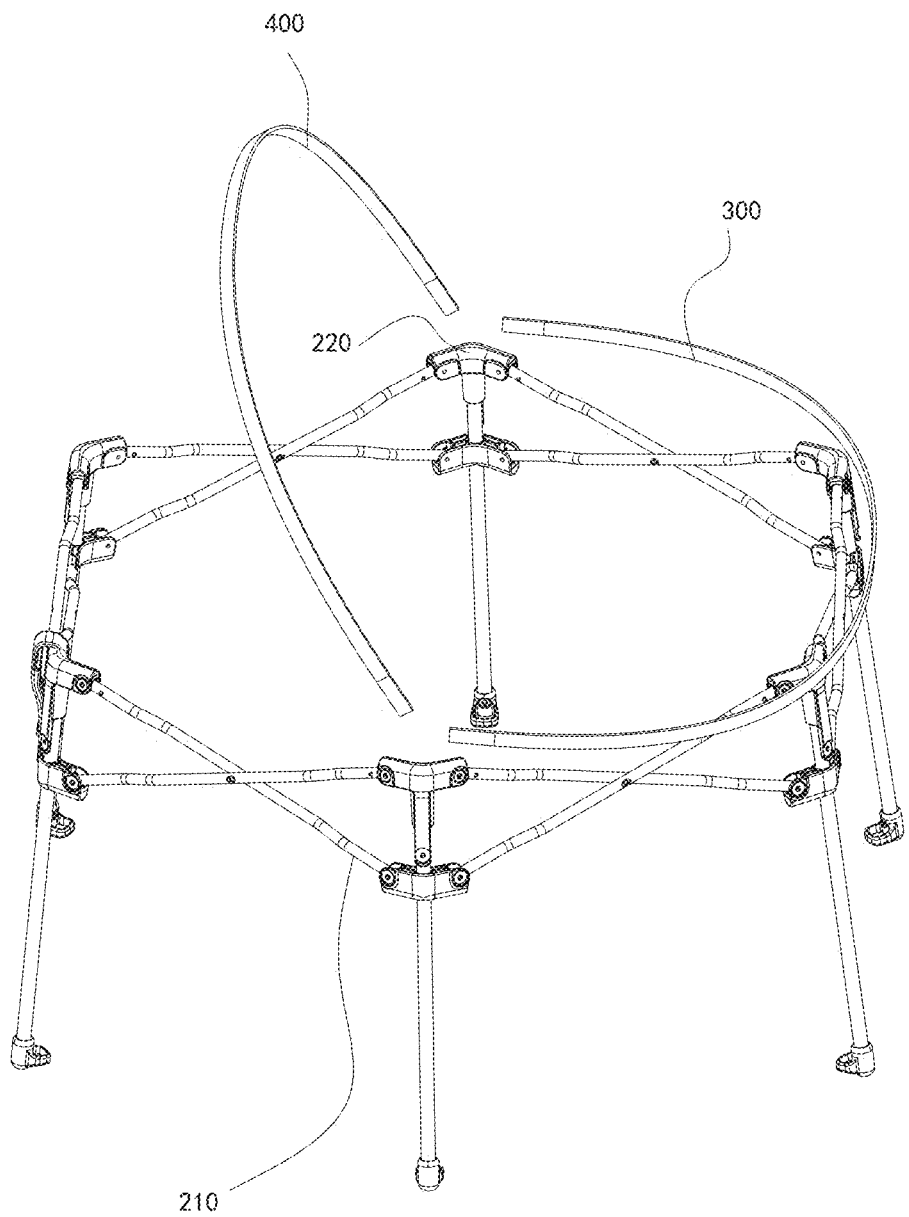
FIG. 5 illustrates an exploded perspective view of the baby bed according to the present application, wherein the canopy engagement device, the cover cloth and the surround cloth are not illustrated.
Figure 6:
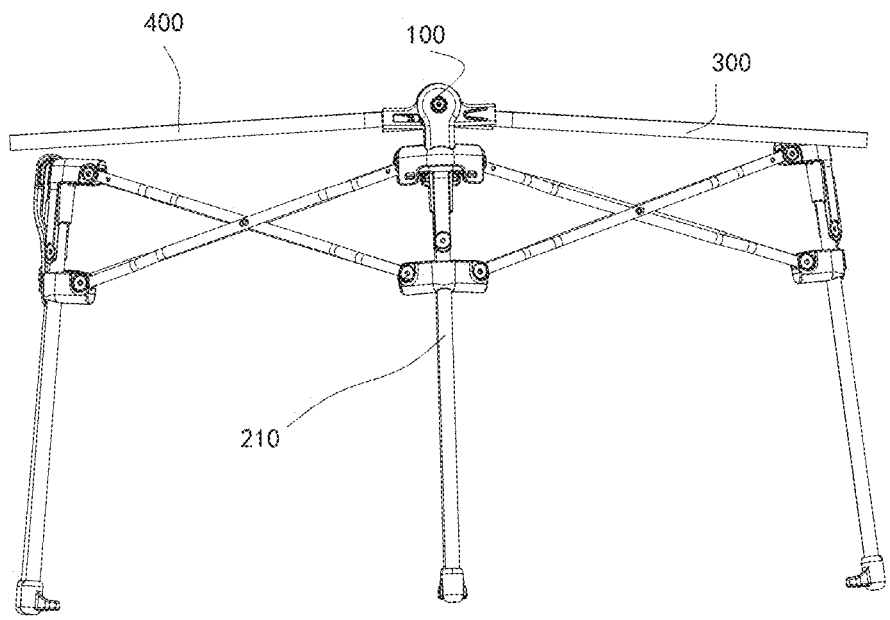
FIG. 6 illustrates a side view of the baby bed according to the present application, wherein the first canopy rod and the second canopy rod are both in the deployed position.
Figure 7:
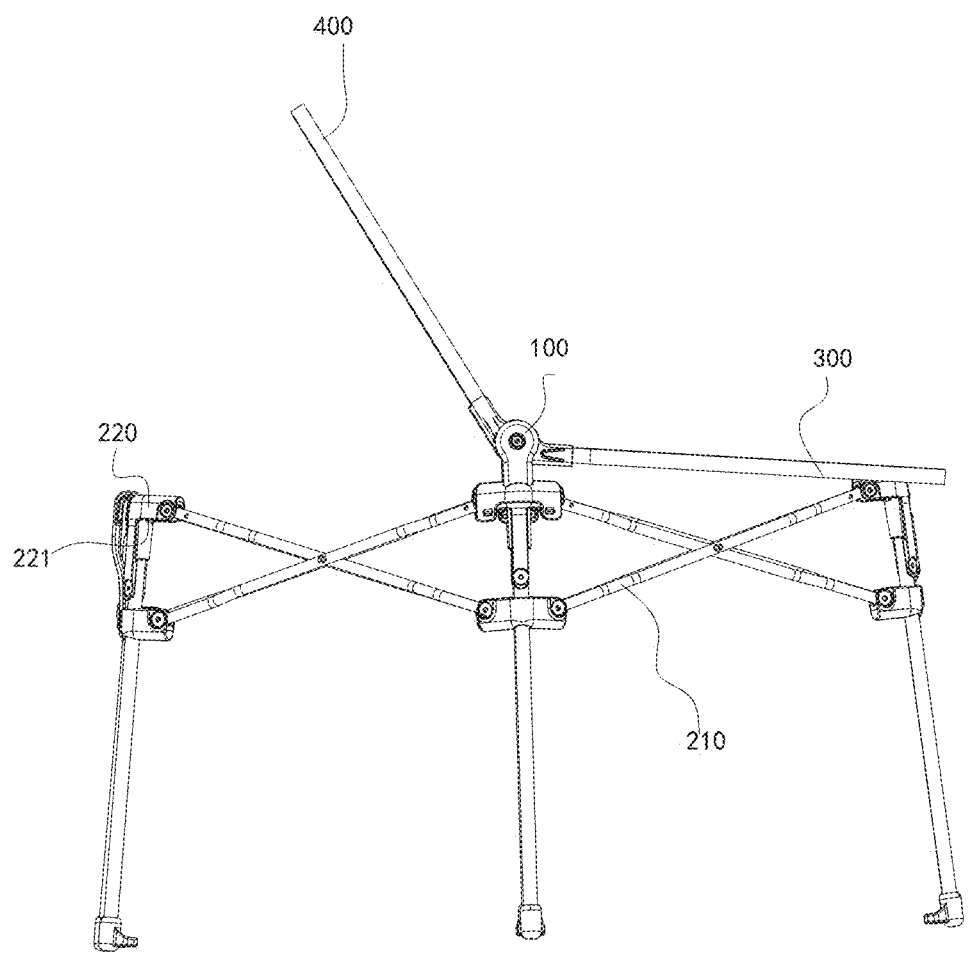
FIG. 7 illustrates a side view of the baby bed according to the present application, wherein the first canopy rod is in a deployed position and the second canopy rod is in a collapsed position.
Figure 8:
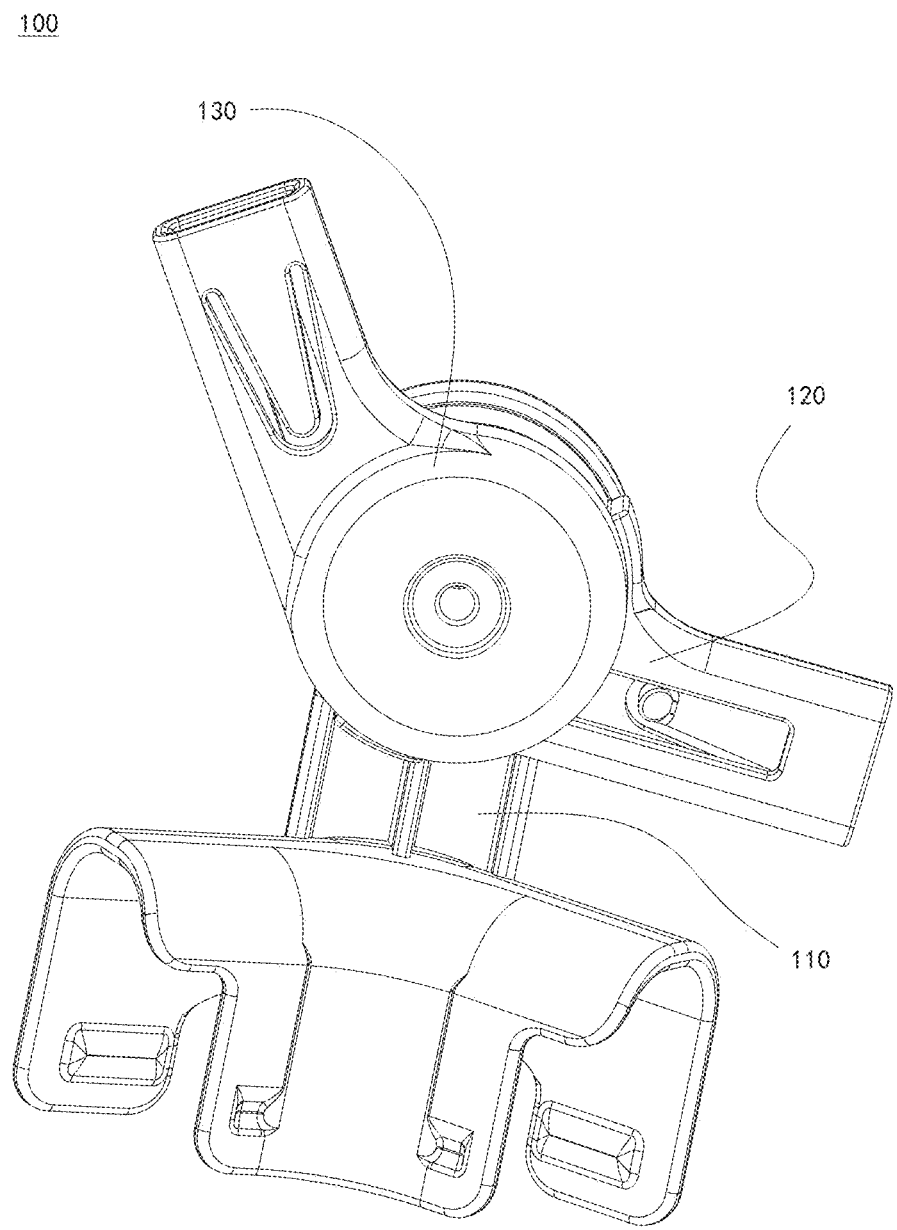
FIG. 8 illustrates a side view of the canopy engagement device according to the present application viewed from inside.
Figure 9:
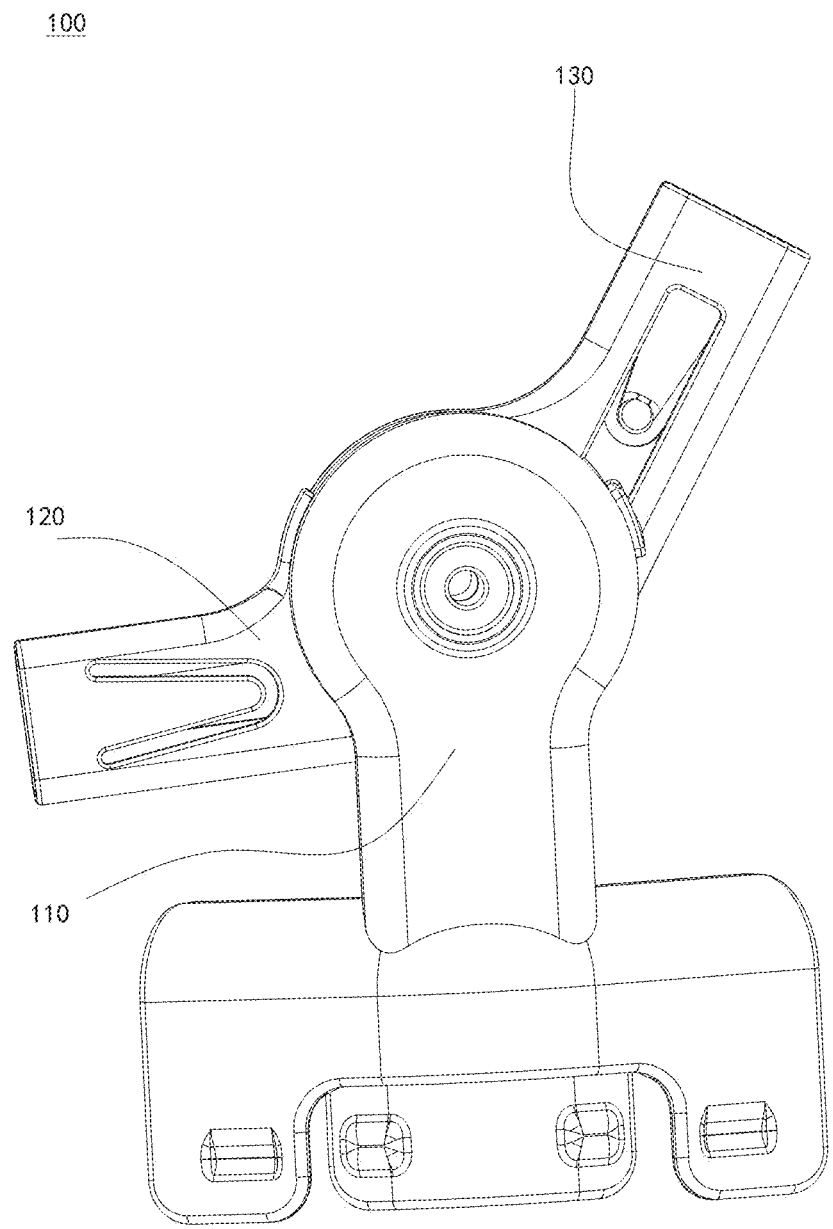
FIG. 9 illustrates a side view of the canopy engagement device according to the present application viewed from outside.

Although the invention is illustrated and described herein with reference to specific embodiments, the invention should not be limited to the illustrated details. Specifically, within the scope of the equivalents of the claims and without departing from the invention, various modifications can be made to these details.

Direction descriptions such as "front," "back," "up" and "down" related herein are only for convenience of understanding. The invention is not limited to these directions, but can be adjusted according to the actual situation.

A carrier 200 (e.g. baby bed) and a canopy applied to the carrier 200 according to the present application are generally described with reference to FIGS. 1 to 7. The carrier 200 has a frame 210, and bottom and side surfaces of the frame 210 are covered with a surround cloth 230 (FIGS. 13 to 15) to bear a baby. In this embodiment, the frame 210 can be embodied in a collapsible or foldable manner, while in another embodiment, the frame 210 can be embodied in a fixed manner. In this embodiment, the frame 210 is hexagonal, while in another embodiment, the frame 210 may have different shapes, such as a rectangular or circular shape.

An upper part of the frame 210 is provided with an installing part 220. The installing part 220 may be a polyline-shaped part bent along the upper edge of the frame 210, or an arc-shaped, a linear-shaped or another shaped part. In this embodiment, the installing part 220 is disposed at each corner of the frame 210, that is, six installing parts 220 are evenly distributed along the upper edge of the frame 210, while in other embodiments, more or less installing part 220, such as two, four or eight installing parts 220 can be provided.

A canopy engagement device 100 can be separaably inserted on the carrier 200, and more specifically, inserted on the installing part 220 of the carrier 200. The canopy engagement device 100 can be engaged on any installing part 220. In this embodiment, two canopy engagement devices 100 are inserted symmetrically on two opposite installing parts 220.

The first canopy rod 300 and the second canopy rod 400 can be rotatably connected to the canopy engagement device 100, respectively, and a rotation axis X is approximately a straight line connecting the two canopy engagement devices 100. Both ends of a cover cloth 500 (FIGS. 13 to 15) are respectively connected to the first canopy rod 300 and the second canopy rod 400. Through the canopy engagement device 100 of the present application, the first canopy rod 300 and the second canopy rod 400 are independently rotatable. When the first canopy rod 300 and the second canopy rod 400 are rotated to a respective side such that the carrier 200 get close to the horizontal position (FIG. 6), the cover cloth 500 is fully deployed to form a complete sunshade. When one of the first canopy rod 300 and the second canopy rod 400 rotates close to the upper part of the carrier 200, and the other rotates to form a angle with the upper part of the carrier 200 (FIGS. 1 to FIG. 5, and FIG. 7), the cover cloth 500 is partially deployed to form a partial sunshade. When the first canopy rod 300 and the second canopy rod 400 are rotated to overlap with each other and close to the horizontal position (not shown), the cover cloth 500 is fully folded, so that the sunshade is fully collapsed.

The canopy engagement device 100 according to the present application will be described in detail with reference to FIGS. 8 to 12. The canopy engagement device 100 comprises a socket 110, a first rotation base 120, a second rotation base 130, and a locking member 140. The canopy engagement device 100 may further comprise an elastic member 150.

The socket 110 is provided to connect the canopy engagement device 100 and the carrier 200. The socket 110 comprises a base end 112 and an engagement end 111, the base end 112 is rotationally connected to the first rotation base 120 and the second rotation base 130, and the engagement end 111 is connected to the carrier 200. The shape of the engagement end 111 corresponds to the shape of the installing part 220 on the carrier 200. More specifically, the shape of the engagement end 111 can be a clamp-shaped sleeve outside the installing part 220, and the lower end of the engagement end 111 can be provided with an inwardly projecting clamping part 115. When the engagement end 111 is sleeved on the installing part 220, the clamping part 115 is clamped to a joint part 221 of the installing part 220 (such as a lower edge of the installing part 220, see Fig.7) so as to fix the canopy engagement device 100 to the carrier 200. The base end 112 has a disc-shape, and the center of the disc-shape defines the rotation axis X. In this embodiment, the rotation axis X is substantially perpendicular to a connecting line between the engagement end 111 and the base end 112. That is, the connecting line between the engagement end 111 and the base end 112 extends substantially in a vertical direction, while the rotation axis X extends substantially in a horizontal direction.

One side of the base end 112 faces towards the interior of the carrier 200, hereinafter referred to as the inner side, the other side of the base end 112 faces towards the exterior of the carrier 200, hereinafter referred to as the outer side.

The inner side of the base end 112 is provided with a first positioning depression 113 in the form of a sector depression centered on the rotation axis X. Multiple first positioning depression 113 are arranged along the circumference direction. The first positioning depressions 113 are used to accommodate and clamp the first positioning protrusion 123 on the first rotation base 120 (as in FIG. 10 and FIG. 11), so as to maintain the angle between the first rotation base 120 and the base end 112. In other embodiments, the base end 112 can be provided with the first positioning protrusion 123 instead of the first positioning depression 113, and accordingly, the first rotation base 120 can be provided with the first positioning depression 113 instead of the first positioning protrusion 123.

A first rotation limiting part 114 is provided at a circumferential position of the socket 110. In this embodiment, the first rotation limiting part 114 is arranged as a sheet portion extending in the axial direction from a circumferential edge of the socket 110 towards an inner side. In other embodiments, the first rotation limiting part 114 may be configured as a rod or another suitable shape. The first rotation limiting part 114 is used to limit the range of the rotation angle between the socket 110 and the first rotation base 120, which will be described in detail below.

The first rotation base 120, the second rotation base 130 and the locking member 140 are respectively overlapped with each other and connected to the base end 112 of the socket 110, and can rotate around the same rotation axis X relative to the socket 110. The first rotation base 120 is positioned between the base end 112 and the second rotation base 130, and the first canopy rod 300 and the second canopy rod 400 are respectively inserted into the first rotation base 120 and the second rotation base 130 in a direction perpendicular to the rotation axis X. More specifically, in the direction of the rotation axis X, the socket 110, the first rotation base 120, the locking member 140 and the second rotation base 130 are successively arranged from outer side to inner side. A rotation shaft 160 sequentially penetrates the centers of the above-mentioned components, such that these components are rotatably assembled together.

The first rotation base 120 is provided with a first disc-shaped part 121 and a first canopy rod engagement part 122. The center of the first disc-shaped part 121 is located at the rotation axis X, and the first canopy rod engagement part 122 extends outward from the outer circumference of the first disc-shaped part 121 in a direction perpendicular to the rotation axis X. One end of the first canopy rod 300 is inserted on the first canopy rod engagement part 122, such that the rotation of the first disc-shaped part 121 around the rotation axis X drives the first canopy rod 300 to rotate around the rotation axis X. A first positioning protrusion 123 rising toward the socket 110 is provided on one side (i.e., outer side) of the first disc-shaped part 121 facing the socket 110, The shape and position of the first positioning protrusion 123 correspond to the shape and position of the first positioning depression 113, and in this embodiment, it is a sector centered on the rotation axis X. In this embodiment, a pair of first positioning protrusions 123 symmetrical along the rotation axis X are provided, while in other embodiments, only one first positioning protrusion 123 can be provided, or more first positioning protrusions 123 can be provided. As previously described, the first positioning protrusion 123 on the first rotation base 120 and the first positioning depression 113 on the socket 110 can be interchanged with each other.

A first clipping part 124 is provided at a circumferential position of the first rotation base 120, and the first rotation limiting part 114 interacts with the first clipping part 124. In one embodiment, the first clipping part 124 is provided along the circumference of the first rotation base 120, such that the first rotation base 120 is limited to rotate between a first angle position and a second angle position relative to the socket 110. When viewing from the side of the socket 110, if the engagement end 111 of the socket 110 is located at 6 o'clock position of a clock plane, the first angle position is at approximately 3 o'clock position, and the second angle position is at approximately 11 o'clock position.

The locking member 140 is inserted between the first rotation base 120 and the second rotation base 130, and can rotate along with the first rotation base 120 to limit the angel between the first rotation base 120 and the second rotation base 130 changes within a range. In this embodiment, the locking member 140 is arranged in a hollow cylindrical space of the first rotation base 120.

In this embodiment, the inner wall of the first rotation base 120 is provided with an externally convex insert block 125, the outer wall of the locking member 140 is provided with an internally concave slot 143. Through the connection between the slot 143 and the insert block 125, the locking member 140 is disposed in the first rotation base 120 in a non-rotatable manner with respect to the first rotation base 120. In other embodiments, the insert block 125 of the first rotation base 120 and the slot 143 of the locking member 140 can be interchanged, that is, the inner wall of the first rotation base 120 is provided with the internally concave slot 143, while the outer wall of the locking member 140 is provided with the externally convex insert block 125. The locking member 140 is inserted in the first rotation base 120 in a slidable manner, such that the first rotation base 120 and the insert block 125 are respectively outward against the socket 110 and inward against the second rotation base 130.

Figure 10:
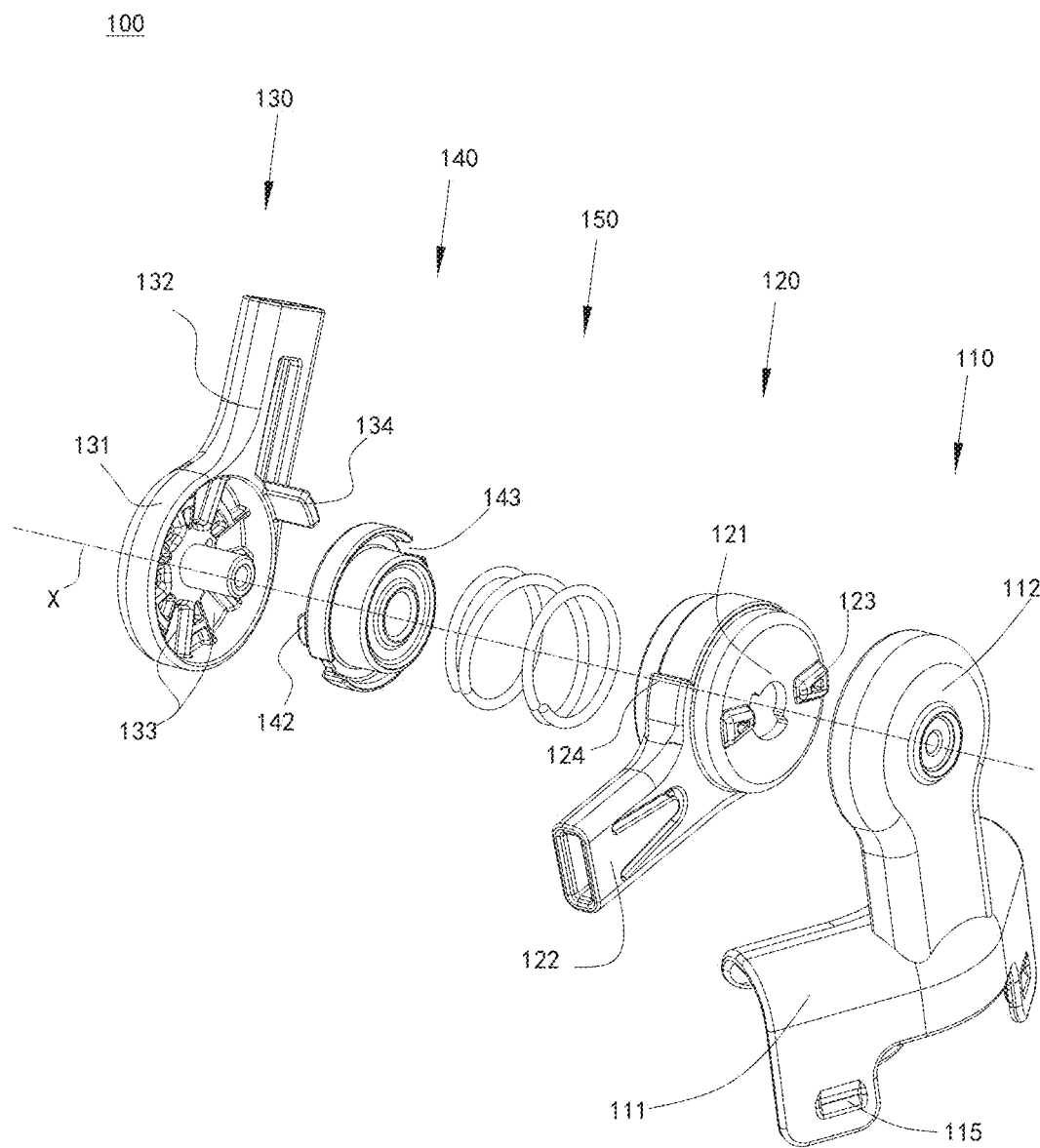
FIG. 10 and FIG. 11 respectively illustrate exploded perspective views of different angles of the canopy engagement device according to the present application.
Figure 11:
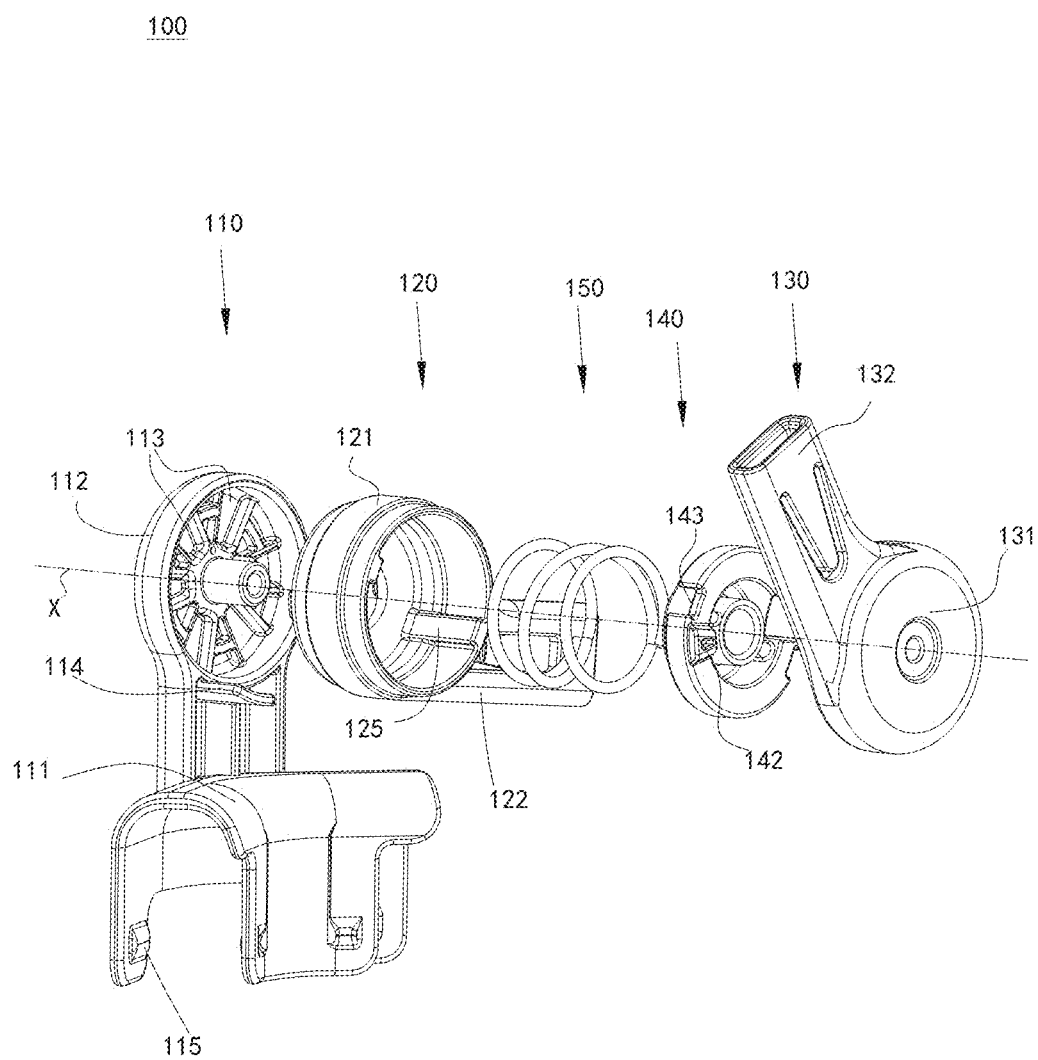
Figure 12:
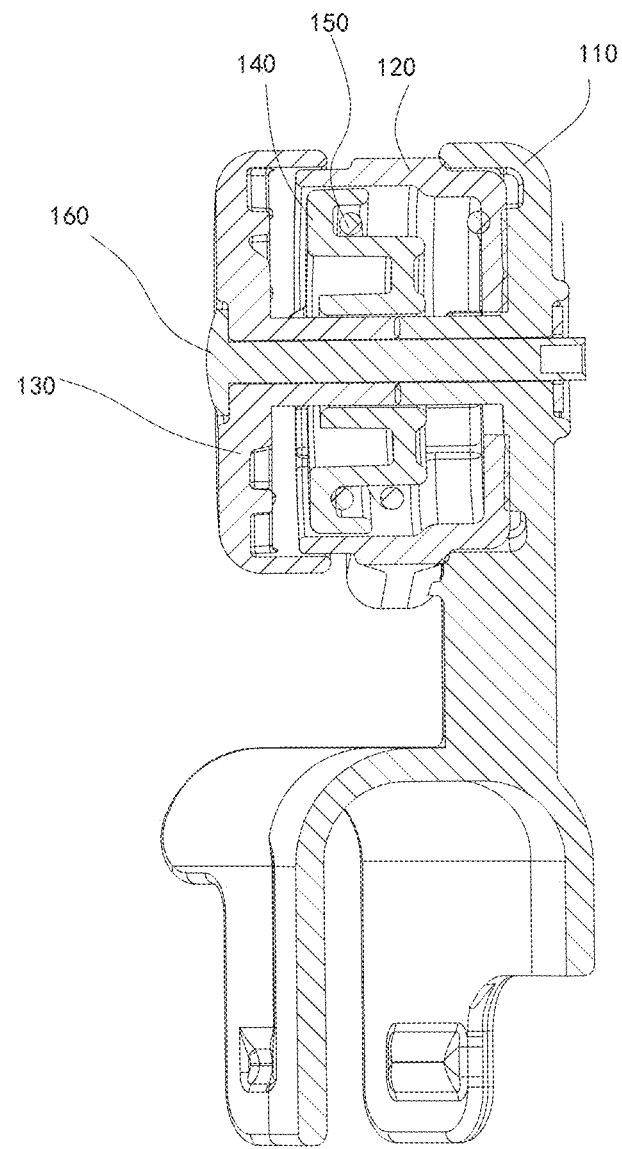
FIG. 12 illustrates a side sectional view of the canopy engagement device according to the present application that is vertically cut through its pivot center.

In this embodiment, the locking member 140 has a disc shape, and a second positioning protrusion 142 (as shown in FIGS. 10 and 11) is provided on the side of the locking member 140 facing the second rotation base 130, and the second positioning protrusion 142 is inserted into a second positioning depression 133 of the second rotation base 130, so as to maintain the angle between the locking member 140 and the second rotation base 130. In other embodiments, the locking member 140 may be provided with the second positioning depression 133 instead of the second positioning protrusion 142, and accordingly, the second rotation base 130 is provided with the second positioning protrusion 142 instead of the second positioning depression 133. The shape of the second positioning protrusion 142 is similar to that of the first positioning protrusion 123, and the detail description will be omitted.

The second rotation base 130 is provided with a second disc-shaped part 131 and a second canopy rod engagement part 132. A center of the second disc-shaped part 131 is positioned at the rotation axis X, and the second canopy rod engagement part 132 extends outward from an outer circumference of the second disc-shaped part 131 in a direction perpendicular to the rotation axis X. One end of the second canopy rod 400 is inserted on the second canopy rod engagement part 132, such that the rotation of the second disc-shaped part 131 around the rotation axis X drives the second canopy rod 400 rotate around the rotation axis X. The concave second positioning depression 133 is provided on one side (i.e., inner side) of the second disc-shaped part 131 facing the locking member 140. The shape and position of the second positioning depression 133 correspond to the second positioning protrusion 142. The shape of the second positioning depression 133 is similar to that of the first positioning depression 113, and the detail description will be omitted.

A second clipping part 134 is provided at the circumferential position of the second rotation base 130. The second clipping part 134 is provided to extend from the outer circumference of the second rotation base 130 towards the first rotation base 120, when the second rotation base 130 rotates to a certain angle position, the second clipping part 134 will abut against the first clipping part 124. The second clipping part 134 interacts with the first clipping part 124 of the first rotation base 120, so that the second rotation base 130 is limited to rotate relative to the first rotation base 120 in a range of 0-180°.

The elastic member 150 is provided between the first rotation base 120 and the locking member 140. In this embodiment, the elastic member 150 is a compression spring, which biases the first rotation base 120 and the locking member 140 to move apart from each other along the axis direction. In other words, the elastic member 150 biases the first rotation base 120 to the base end 112 of the socket 110, and biases the locking member 140 to the second rotation base 130.

In this way, under the bias of the elastic member 150, the first positioning protrusion 123 of the first rotation base 120 tends to be clamped in the first positioning depression 113 of the base end 112. When the user pulls the first rotation base 120, the first rotation base 120 will overcome the bias of the elastic member 150 and moves slightly away from the base end 112, such that the first positioning protrusion 123 is separated from the first positioning depression 113. A side edge of the first positioning protrusion 123 can be provided with an inclined chamfer, so as to convert the rotation force of pulling the first rotation base 120 into an axial force, such that the first rotation base 120 leaves the base end 112 of the socket 110. With the relative rotation of the first rotating base 120 and the base end 112, the first positioning protrusion 123 is aligned with one of the first positioning depressions 113, at this time, the first rotation base 120 moves towards the socket 110 under the bias of the elastic member 150, and the first positioning protrusion 123 is clamped into the corresponding first positioning depression 113, so as to maintain the relative rotation position of the first rotation base 120 and the socket 110. In this way, under the bias of the elastic member 150, a process of positioning-rotating-repositioning between the first positioning depression 113 of the socket 110 and the first positioning protrusion 123 of the first rotation base 120 is completed. That is, the first positioning depression 113 and the first positioning protrusion 123 are firstly in position with each other, then they are relatively rotated with each other, and finally they are in position each other again.

In the same way, under the bias of the elastic member 150, a similar process of positioning-rotating-repositioning between the second positioning protrusion 142 of the locking member 140 and the second positioning depression 133 of the second rotation base 130 can be completed.

Therefore, the canopy engagement device 100 according to the present application has a rather simple structure, and realizes the independent rotation and positioning of the first canopy rod 300 and the second canopy rod 400 with as few components as possible, With reference to Figs, 13 to 16, how the canopy engagement device 100 according to the present application cooperates with the cover cloth 500 will be described.

Both ends of the cover cloth 500 are respectively fixed to the first canopy rod 300 and the second canopy rod 400. A middle of the cover cloth 500 can also be provided with one or more intermediate support rods 600 to maintain the shape of the cover cloth 500. The intermediate support rod 600 is also configured to rotate around the rotation axis X.

Figure 13:
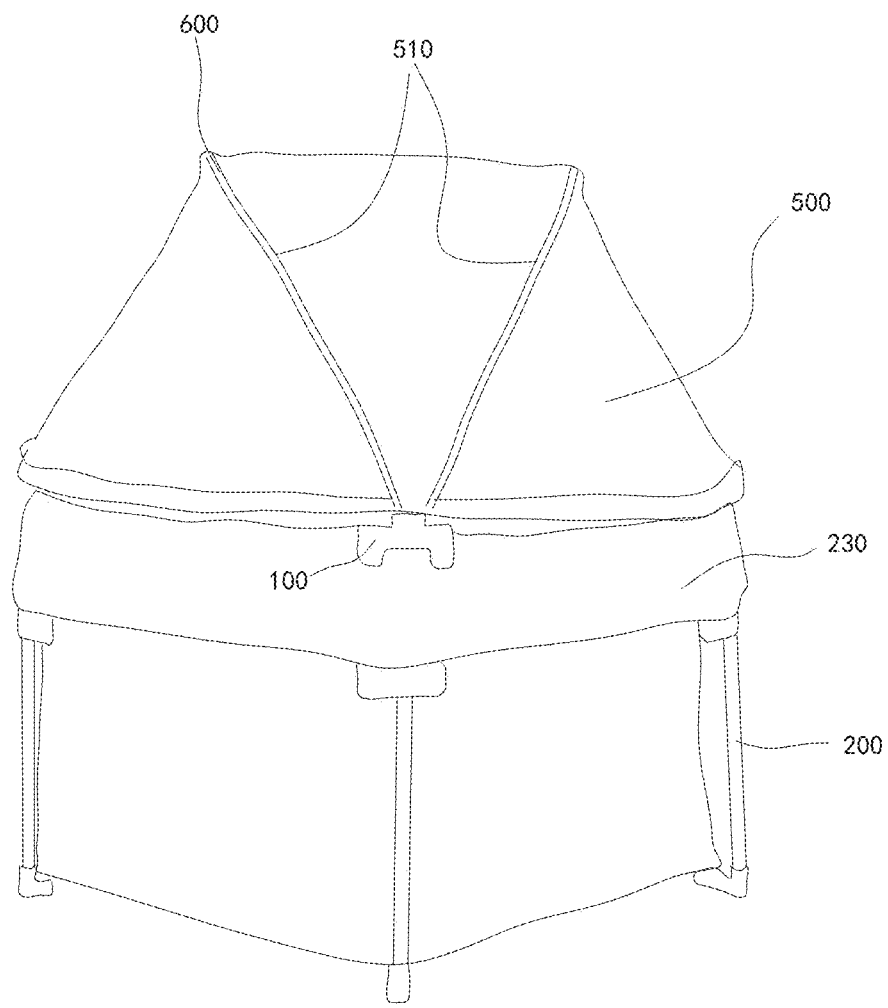
FIG. 13 illustrates a schematic diagram of the baby bed with the canopy according to an embodiment of the present application, wherein each canopy rod is in a deployed position.
Figure 14:
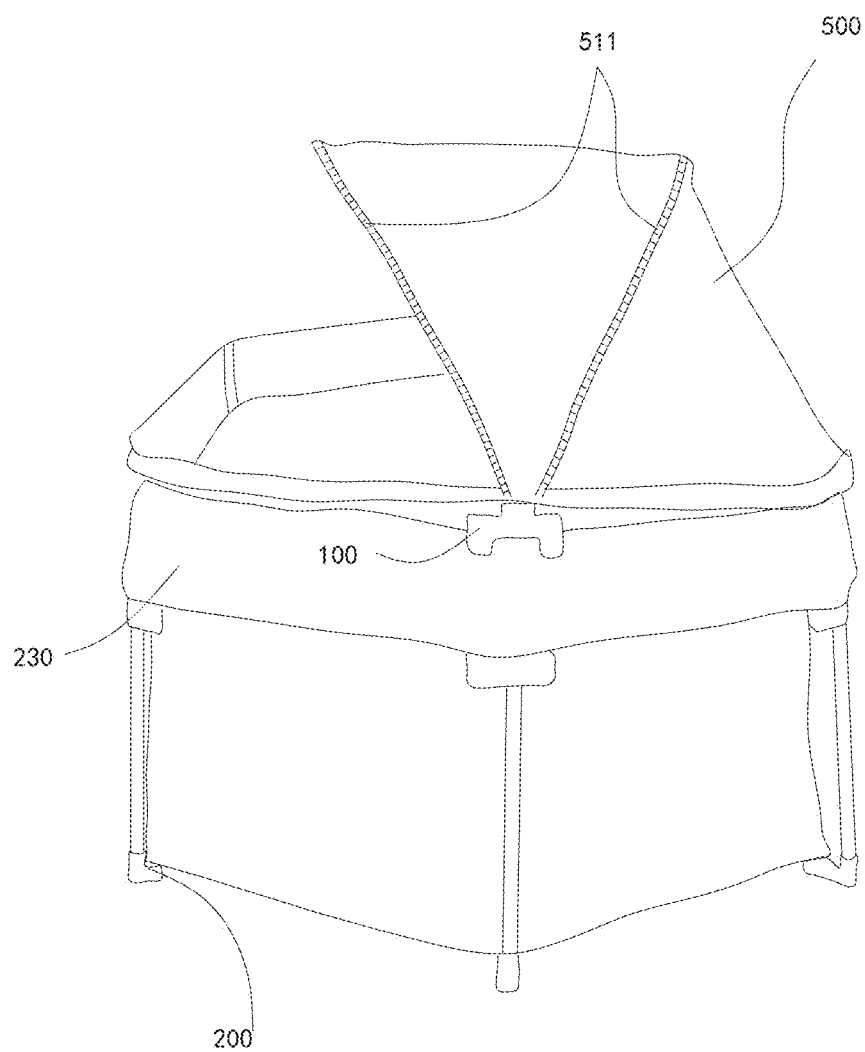
FIG. 14 illustrates a schematic diagram of the baby bed with the canopy according to another embodiment of the present application, wherein the first canopy rod is in a deployed position, and the second canopy rod is in a collapsed position.
Figure 15:
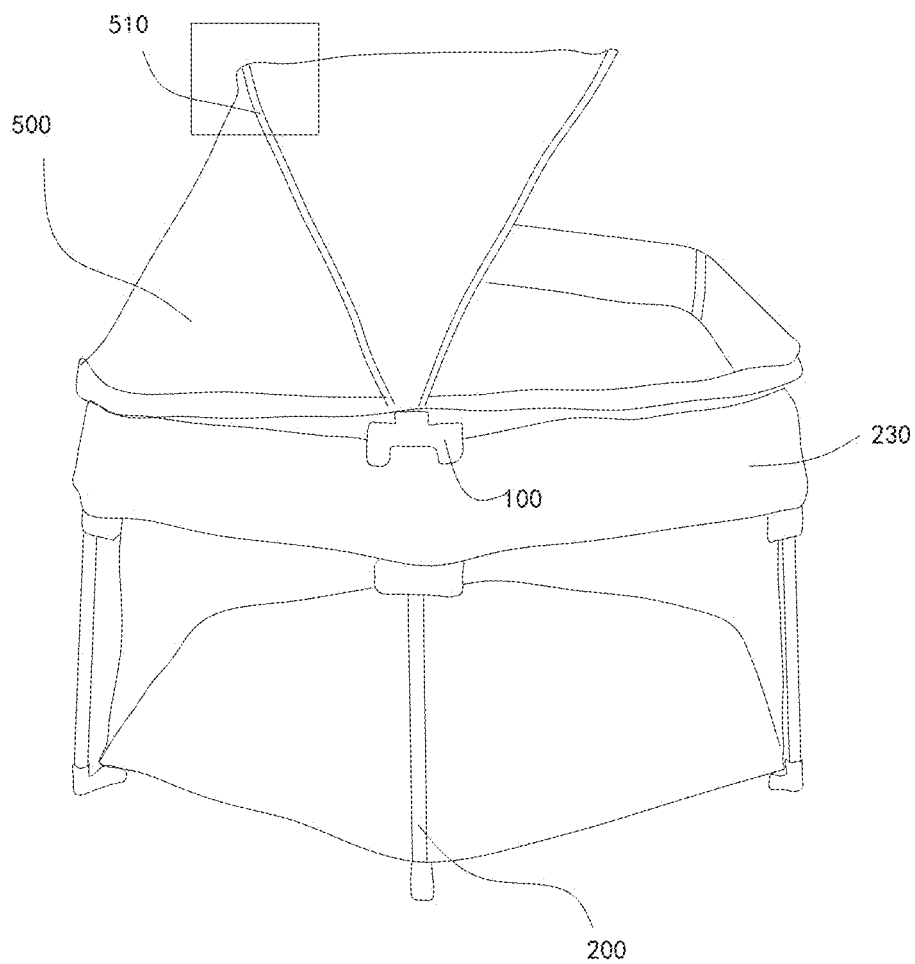
FIG. 15 illustrates a schematic diagram of the baby bed with the canopy according to another embodiment of the present application, wherein the first canopy rod is in a collapsed. position, and the second canopy rod is in a deployed position.

When the angle between the first canopy rod 300 and the second canopy rod 400 is 180°, the cover cloth 500 is fully deployed, as shown in FIG. 13. When the angle between the first canopy rod 300 and the second canopy rod 400 is another angle between 0-180°, such as 120°, the cover cloth 500 is partially deployed, as shown in FIGS. 14 and 15. In order to keep the cover cloth 500 stably in the partially deployed position, the cover cloth 500 is provided with a collapsible fixing device (510), which is used to maintain the first canopy rod 300 or the second canopy rod 400 to the intermediate support rod 600, or maintain one intermediate support rod 600 to another intermediate support rod 600.

For example, the collapsible fixing device (510) can be a zipper 511, as shown in FIG. 14. Specifically, two adjacent intermediate support rods 600 can be provided with matched zippers 511. When the cover cloth 500 is partially deployed, the two intermediate support rods 600 overlap with each other. At this time, the zippers 511 of the two can be engaged to maintain the cover cloth 500 in the partially deployed state.

Figure 16:
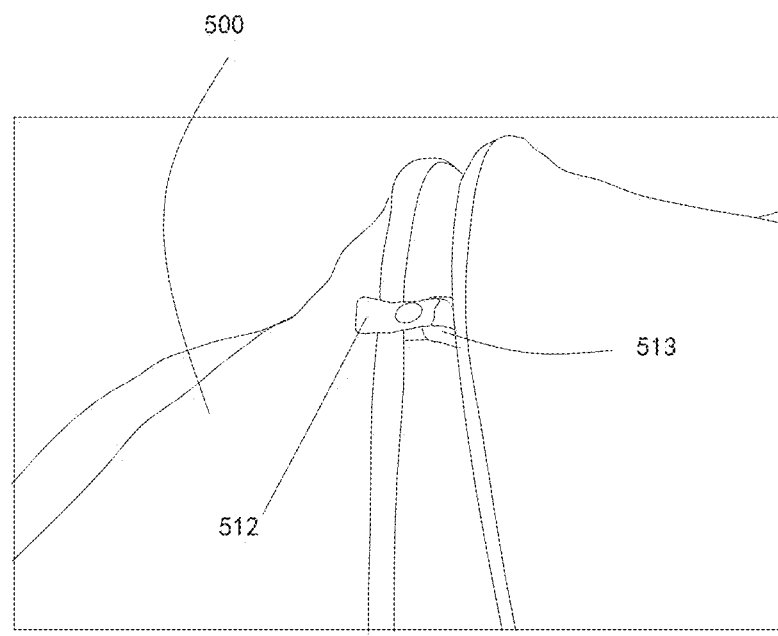
FIG. 16 is a partial enlarged view of the block part in FIG. 15, illustrating button and fixing ring on the cover cloth of the canopy according to the present application.

For another example, the collapsible fixing device (510) can be a button 512 and a fixing ring 513, as shown in FIGS. 15 to 16. Specifically, the first canopy rod 300 (or the second canopy rod 400 and the intermediate support rod 600) is provided with cloth strip and a button 512 on the cloth strip, and the adjacent intermediate support rod 600 is provided with the fixing ring 513. When the cover cloth 500 is partially deployed, the cloth strip passes through the fixing ring 513, and the button 512 clamps the cloth strip, thus fixing the cover cloth 500 in partially deployed state.

In summary, the present application discloses a canopy engagement device, which can detachably engage the canopy to the carrier such as a baby cot. Moreover, the canopy engagement device allows the two canopy rods to rotate and position independently of each other, thereby supporting the full deployment and partial deployment of the canopy.

Although preferred embodiments have been illustrated and described herein, it should be understood that these embodiments are given only as examples. Those skilled in the art will think of many variants, changes and replacements without departing from the spirit of the present invention. Accordingly, the appended claims are intended to cover all such variations falling within the spirit and scope of the present invention.

LIST OF REFERENCE MARKS

100 Canopy Engagement Device
  110 Socket
    111 Engagement End
    112 Base End
    113 First Positioning Depression
    114 First Rotation Limiting Part
    115 Clamping Part
  120 First Rotation Base
    121 First Disc-Shaped Part
    122 First Canopy Rod Engagement Part
    123 First Positioning Protrusion
    124 First Clipping Part
    125 Insert Block
  130 Second Rotation Base
    131 Second Disc-Shaped Part
    132 Second Canopy Rod Engagement Part
    133 Second Positioning Depression
    134 Second Clipping Part
  140 Locking Member
    142 Second Positioning Protrusion
    143 Slot
  150 Elastic Member
  160 Rotation Shaft
  X Rotation Axis
200 Carrier
  210 Frame
  220 installing Part
    221 Joint Part
  230 Surround Cloth
300 First Canopy Rod
400 Second Canopy Rod
500 Cover Cloth
  510 Collapsible Fixing Device
    511 Zipper
    512 Button
    513 Fixing Ring
600 Intermediate Support Rod

What is claimed is:

1. A canopy engagement device for installing a first canopy rod and a second canopy rod to a carrier, wherein the canopy engagement device comprises:
a socket, provided with a base end and an engagement end, the engagement end being engaged with the carrier;
a first rotation base and a second rotation base, the first rotation base provided between the base end of the socket and the second rotation base, the first rotation base and the second rotation base being rotatable relative to the socket, and the first canopy rod and the second canopy rod respectively inserted into the first rotation base and the second rotation base; and
a locking member, disposed between the first rotation base and the second rotation base, rotatable along with the first rotation base to limit an angle between the first rotation base and the second rotation base in a range,
wherein
a first rotation limiting part is arranged at a circumferential position of the socket, a first clipping part is arranged at a corresponding circumferential position of the first rotation base, the first rotation limiting part interacts with the first clipping part, such that the first rotation base is limited to rotate between a first angle position and a second angle position relative to the socket.

2. The canopy engagement device according to claim 1, wherein:
the base end of the socket has a disc shape, the first rotation base and the second rotation base are respectively provided with a first disc-shaped part and a second disc-shaped part, the first disc-shaped part and the second disc-shaped part are sequentially overlapped on the base end along a rotation axis (X).

3. The canopy engagement device according to claim 2, wherein:
one of the first rotation base and the base end has a first positioning protrusion rising toward the other, wherein the other has at least one first positioning depression accommodating the first positioning protrusion so as to limit an angle between the first rotation base and the base end; and
a plurality of said first positioning depressions are distributed along a circumference around the rotation axis (X).

4. The canopy engagement device according to claim 1, wherein:
the locking member is fixed to the first rotation base, one of the second rotation base and the locking member has a second positioning protrusion rising toward the other, the other has at least one second positioning depression accommodating the second positioning protrusion so as to limit the angle between the second rotation base and the first rotation base; and
a plurality of said second positioning depressions are distributed along a circumference around a rotation axis (X).

5. The canopy engagement device according to claim 1, wherein:
the engagement end and the base end of the socket are oppositely provided along a vertical direction perpendicular to a rotation axis (X).

6. The canopy engagement device according to claim 1, wherein:
when viewed in a direction along a rotation axis (X), if the engagement end of the socket is located at six o'clock on a clock plane, the first angle position is located at approximately three o'clock, the second angle position is located at approximately eleven o'clock.

7. The canopy engagement device according to claim 1, wherein:
a second clipping part is arranged at a circumferential position of the second rotation base, and the second clipping part interacts with the first clipping part, such that the second rotation base is limited to rotate relative to the first rotation base in a range of 0-180°.

8. The canopy engagement device according to claim 7, wherein:
the first rotation base has a hollow cylindrical shape, the locking member has a disc shape, the locking member is provided in a hollow cylindrical space of the first rotation base;
one of an inner wall of the first rotation base and an outer wall of the locking member is provided with an externally convex insert block, and the other is provided with an internally concave slot; and
through a connection between the slot and the insert block, the locking member is disposed in the first rotation base in a non-rotatable manner with respect to the first rotation base.

9. The canopy engagement device according to claim 8, wherein:
an elastic member is disposed between the first rotation base and the locking member, the elastic member biases the first rotation base and the locking member apart from each other, such that the first rotation base is pressed against the engagement end of the socket, and the locking member is pressed against the second rotation base.

10. A carrier with a sunshade, wherein the carrier comprising:
a frame, an upper part of which is provided with an installing part;
the canopy engagement device according to claim 1, wherein the engagement end of the socket is engaged on the installing part of the frame; and
a cover cloth is connected between the first canopy rod and the second canopy rod, and deploys or collapses along with the relative rotation between the first canopy rod and the second canopy rod.

11. The carrier according to claim 10, wherein:
at least one additional intermediate support rod is arranged between the first canopy rod and the second canopy rod.

12. The carrier according to claim 11, wherein:
the cover cloth is provided with at least one collapsible fixing device along a deployment direction in which the cover cloth is deployed, and when the cover cloth is collapsed or partially collapsed, said intermediate support rod and an adjacent intermediate support rod in a collapsed state lock with each other through the collapsible fixing device to prevent deployment of said intermediate support rod and the adjacent intermediate support rod.

13. The carrier according to claim 12, wherein:
the frame is provided with a plurality of installing parts along its circumference, the plurality of installing parts including said installing part provided at the upper part of the frame;
the canopy engagement device is engaged on any one of the plurality of installing parts; and
the socket of the canopy engagement device is provided with a clamping part for providing a clamping connection with a joint part on an installing part of the plurality of installing parts.

14. A canopy engagement device for installing a first canopy rod and a second canopy rod to a carrier, wherein the canopy engagement device comprises:
a socket, provided with a base end and an engagement end, the engagement end being engaged with the carrier;
a first rotation base and a second rotation base, the first rotation base provided between the base end of the socket and the second rotation base, the first rotation base and the second rotation base being rotatable relative to the socket, and the first canopy rod and the second canopy rod respectively inserted into the first rotation base and the second rotation base; and
a locking member, disposed between the first rotation base and the second rotation base, rotatable along with the first rotation base to limit an angle between the first rotation base and the second rotation base in a range,
wherein a second clipping part is arranged at a circumferential position of the second rotation base, and the second clipping part interacts with a first clipping part arranged at a circumferential position of the first rotation base, such that the second rotation base is limited to rotate relative to the first rotation base in a range of 0-180°.

15. The canopy engagement device according to claim 14, wherein:
the base end of the socket has a disc shape, the first rotation base and the second rotation base are respectively provided with a first disc-shaped part and a second disc-shaped part, the first disc-shaped part and the second disc-shaped part are sequentially overlapped on the base end along a rotation axis (X).

16. The canopy engagement device according to claim 15, wherein:
one of the first rotation base and the base end has a first positioning protrusion rising toward the other, wherein the other has at least one first positioning depression accommodating the first positioning protrusion so as to limit an angle between the first rotation base and the base end; and
a plurality of said first positioning depressions are distributed along a circumference around the rotation axis (X).

17. The canopy engagement device according to claim 14, wherein:
the locking member is fixed to the first rotation base, one of the second rotation base and the locking member has a second positioning protrusion rising toward the other, the other has at least one second positioning depression accommodating the second positioning protrusion so as to limit the angle between the second rotation base and the first rotation base; and
a plurality of said second positioning depressions are distributed along a circumference around a rotation axis (X).

18. The canopy engagement device according to claim 14, wherein:
the engagement end and the base end of the socket are oppositely provided along a vertical direction perpendicular to a rotation axis (X).

19. A carrier with a sunshade, wherein the carrier comprising:
a frame, an upper part of which is provided with an installing part;
the canopy engagement device according to claim 14, wherein the engagement end of the socket is engaged on the installing part of the frame; and
a cover cloth is connected between the first canopy rod and the second canopy rod, and deploys or collapses along with the relative rotation between the first canopy rod and the second canopy rod.

20. The carrier according to claim 19, wherein:
at least one additional intermediate support rod is arranged between the first canopy rod and the second canopy rod.

* * * * *